United States Patent
Stoltz et al.

(10) Patent No.: US 6,405,255 B1
(45) Date of Patent: *Jun. 11, 2002

(54) MIXING AND SPLITTING MULTIPLE INDEPENDENT AUDIO DATA STREAMS IN KERNEL SPACE

(75) Inventors: Benjamin H. Stoltz; Michael J. Bundschuh, both of Mountain View; Yan J. Yu, Cupertino, all of CA (US)

(73) Assignee: Sun Microsystems, Inc., Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/674,353

(22) Filed: Jul. 1, 1996

(51) Int. Cl.[7] .............................. G06F 15/16; G06F 9/46
(52) U.S. Cl. ....................... 709/231; 709/229; 709/232; 709/233; 709/234; 709/320; 709/322; 713/152; 713/164; 700/94
(58) Field of Search .................................. 709/300, 303, 709/301, 302, 219, 229, 231, 315, 319, 327, 328, 321, 322, 232, 233, 234, 320; 713/151, 152, 164, 165, 189, 200, 201; 700/94; 369/4; 380/236, 237, 239

(56) References Cited

U.S. PATENT DOCUMENTS

| | | | | |
|---|---|---|---|---|
| 5,481,719 A | * | 1/1996 | Ackerman et al. | 709/108 |
| 5,485,409 A | * | 1/1996 | Gupta et al. | 713/200 |
| 5,502,573 A | * | 3/1996 | Fujinami | 386/65 |
| 5,519,833 A | * | 5/1996 | Agranat et al. | 709/231 |
| 5,521,918 A | * | 5/1996 | Kim | 370/428 |
| 5,584,023 A | * | 12/1996 | Hsu | 707/204 |
| 5,640,320 A | * | 6/1997 | Jackson et al. | 700/87 |
| 5,664,044 A | * | 9/1997 | Ware | 386/75 |
| 5,692,213 A | * | 11/1997 | Goldberg et al. | 345/302 |
| 5,703,794 A | * | 12/1997 | Heddle et al. | 700/94 |
| 5,726,989 A | * | 3/1998 | Dokic | 370/509 |
| 5,734,731 A | * | 3/1998 | Marx | 381/119 |
| 5,761,498 A | * | 6/1998 | Ooe et al. | 707/10 |
| 5,768,126 A | * | 6/1998 | Frederick | 700/94 |
| 5,768,527 A | * | 6/1998 | Zhu et al. | 709/231 |
| 5,801,685 A | * | 9/1998 | Miller et al. | 345/302 |
| 5,815,634 A | * | 9/1998 | Daum et al. | 386/96 |
| 5,815,707 A | * | 9/1998 | Krause et al. | 709/321 |
| 5,845,239 A | * | 12/1998 | Laczko, Sr. et al. | 704/200 |
| 5,847,765 A | * | 12/1998 | Sanpei | 375/240.05 |
| 5,892,506 A | * | 4/1999 | Hermanson | 345/302 |
| 5,894,557 A | * | 4/1999 | Bade et al. | 709/228 |
| 5,899,987 A | * | 5/1999 | Yarom | 707/3 |
| 5,918,228 A | * | 6/1999 | Rich et al. | 707/10 |
| 5,920,572 A | * | 7/1999 | Washington et al. | 370/535 |
| 5,946,487 A | * | 8/1999 | Dangelo | 717/5 |
| 5,956,088 A | * | 9/1999 | Shen et al. | 375/240.35 |
| 5,956,710 A | * | 9/1999 | Yarom | 707/3 |
| 6,047,323 A | * | 4/2000 | Krause | 709/227 |
| 6,070,198 A | * | 5/2000 | Krause et al. | 709/321 |
| 6,098,112 A | * | 8/2000 | Ishijima et al. | 709/301 |
| 6,122,668 A | * | 9/2000 | Teng et al. | 709/231 |
| 6,137,834 A | * | 10/2000 | Wine et al. | 375/240 |
| 6,181,712 B1 | * | 1/2001 | Rosengren | 370/474 |

* cited by examiner

Primary Examiner—Mark H. Rinehart
Assistant Examiner—William C. Vaughn, Jr.
(74) Attorney, Agent, or Firm—Blakely Sokoloff Taylor & Zafman

(57) ABSTRACT

A method and an apparatus for securely mixing and splitting multiple audio data streams and determining the order of processing the audio streams. A audio server and an audio device driver are in kernel space of a given computer system. In one embodiment, the computer system has a data flow checker and adjuster for checking the flow of data into data queues and a setup application for connecting the audio server and the audio device driver. The data flow checker and adjuster adjusts the flow of data by sending a message up or downstream instructing the up or downstream processes/devices to send more data or stop sending data depending on how full the data queues are.

19 Claims, 10 Drawing Sheets

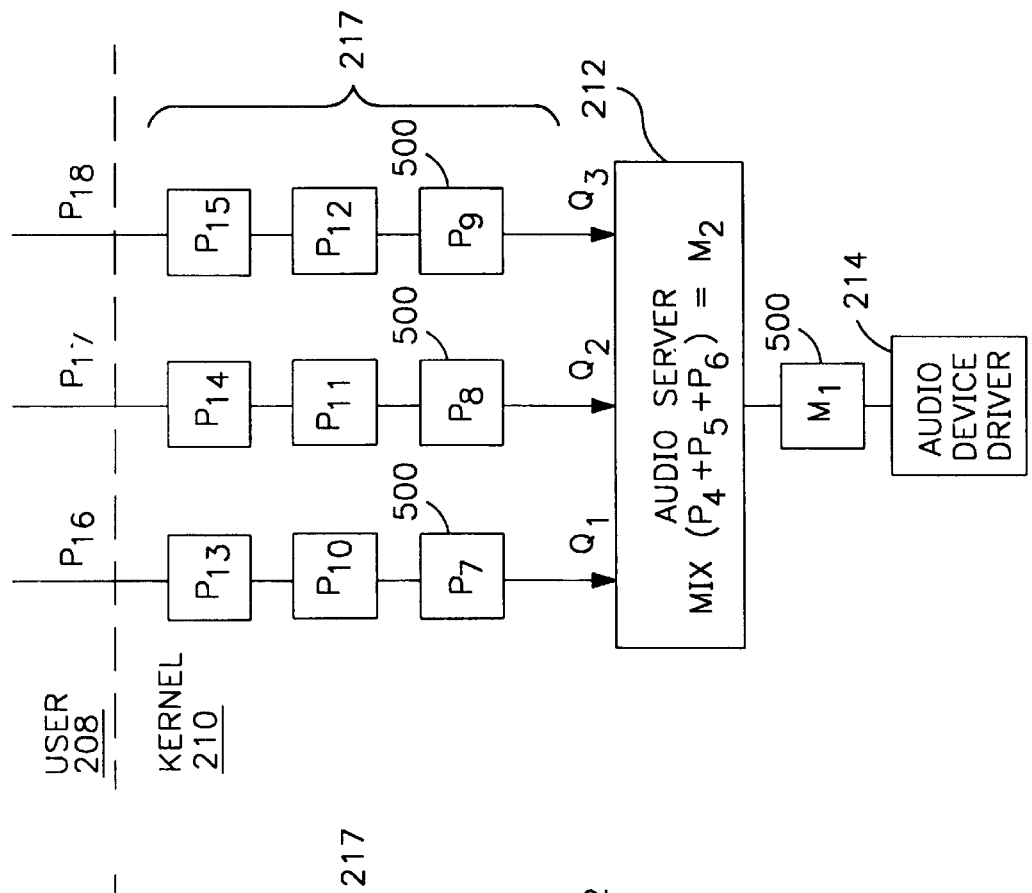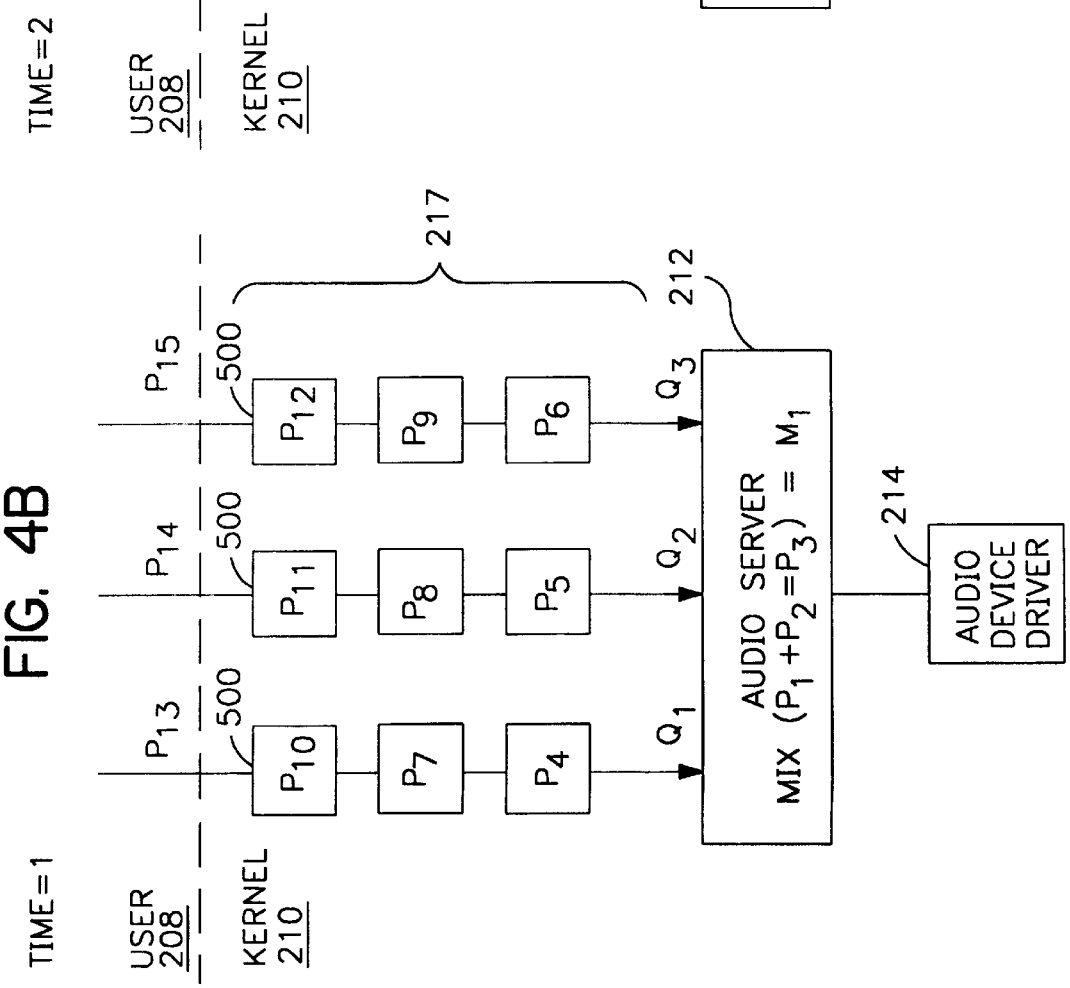

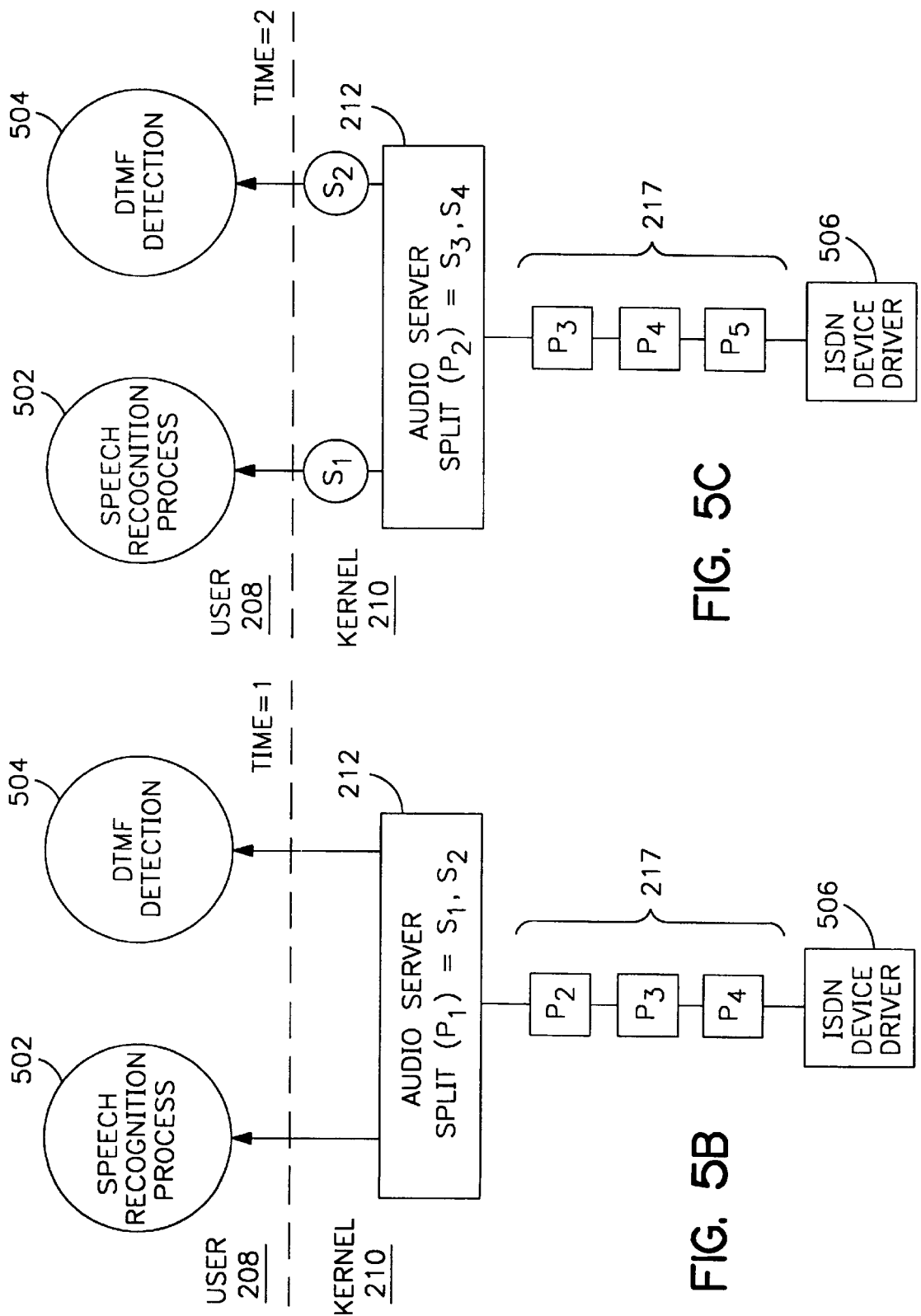

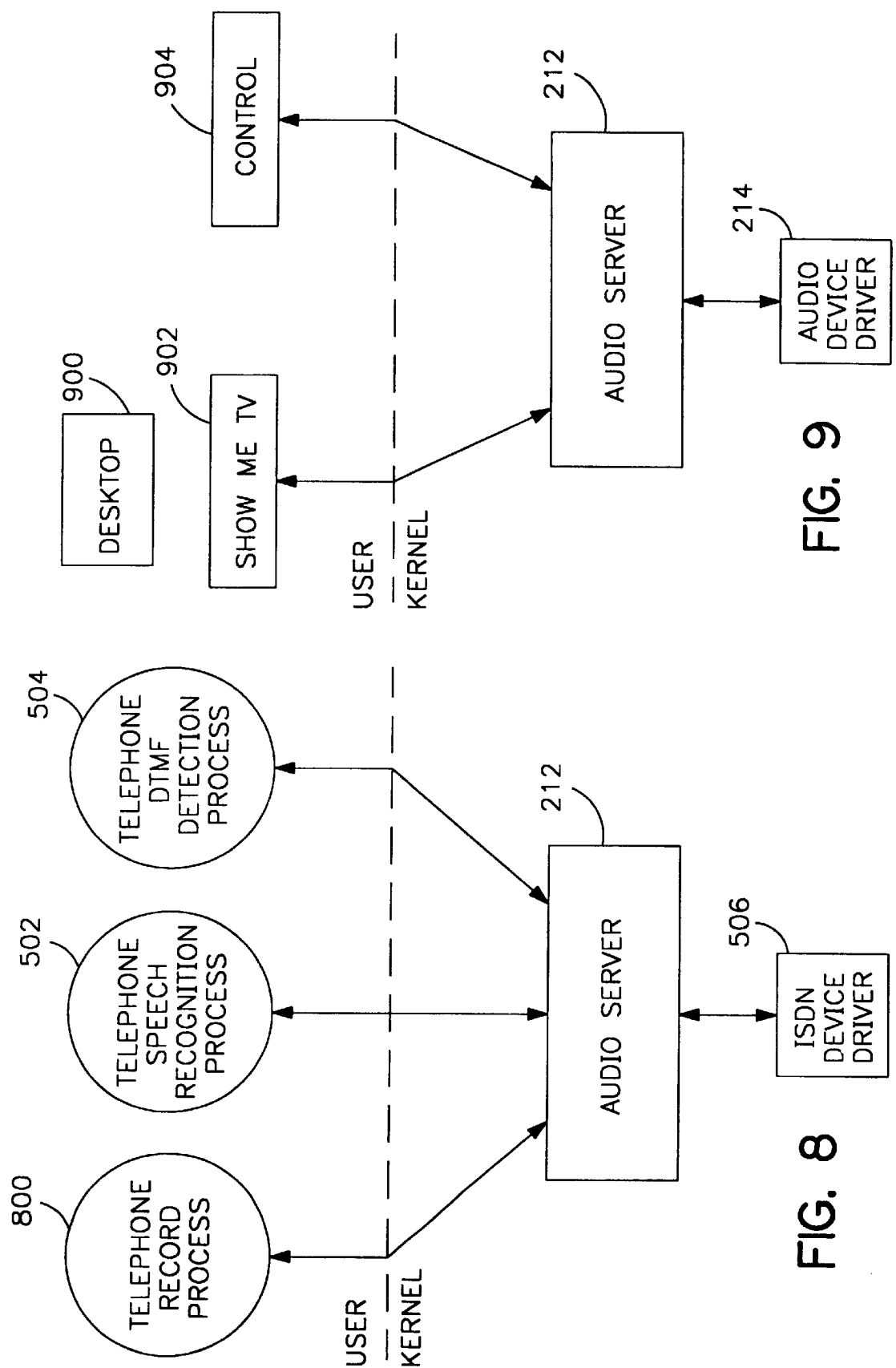

MIXING AND SPLITTING MULTIPLE INDEPENDENT AUDIO DATA STREAMS IN KERNEL SPACE

BACKGROUND OF THE INVENTION (1) Field of the Invention

The present invention relates to the field of providing operating system services for use by audio and video applications. More specifically, the present invention is a method and apparatus for mixing and splitting multiple independent audio data streams in kernel space, i.e. part of an operating system that performs basic functions such as allocating hardware resources.

(2) Art Related to the Invention

Audio and video applications running on a computer (e.g. a workstation, a personal computer "PC", mainframe, etc.) often require mixing and splitting of data (e.g., audio and/or video) as the data is being input or output to some type of network device such as an Integrated Services Digital Network (ISDN) device. An ISDN device is a digital phone network defining B-channels carrying up to 64 Kbps.

Many mixer and splitter devices are implemented in firmware or hardware on a card for a PC. A mixer may mix outputs from two specific audio peripheral devices and mix inputs on a microphone or some other set of peripheral devices. There are also software based mixers and splitters which are available in Apple Macintosh computers, IBM PC's and IBM PC compatibles, Sun Microsystem, Inc.'s workstations and in other UNIX based machines. More particularly, there is the Audio File (AF) system from Digital Equipment Corporation (DEC) of Maynard, Massachusetts, and Network Audio System (NAS) from Network Computing Devices (NCD), Inc. of Mountain View, California, which are both audio servers that have mixing capabilities.

FIG. 1 illustrates an exemplary embodiment of computer employing a conventional mixer/splitter device. Computer 101 includes a storage device 103, processor (CPU) 105 and audio device 110 coupled through bus 107. Audio applications 100, 102 and 104 are coupled to a software-based mixer and splitter, audio server 106. Audio server 106 is contained in user space 108 which the area in the storage device used for execution of user programs, and is coupled to audio device 110. Audio server 106 takes incoming audio data streams from one or more audio applications 100, 102 and 104, mixes them together and transmits them to audio device 110. Audio server 106 also takes an audio data stream coming from the audio device 110, clones the data and transmits the data to one or more audio applications 100, 102 and 104 requesting the data.

As illustrated in FIG. 1, software-based mixing and splitting functions in the prior art are performed in user space 108 and audio device 106 can only handle one audio application at a time. Consequently, an audio application has to provide its own mixing and splitting functions or depend on audio servers such as NAS and AF to provide that functionality via a proprietary API (Application Programming Interface). Further, an audio server retains exclusive use of the audio device, forcing audio applications to use a given audio server or not have access to the audio device at all. This is a poor programming practice since it cannot be assumed that a given audio server will be available on another machine.

It is more desirable to have the capability to process multiple simultaneous audio streams in kernel space rather than in user space since this allows multiple audio applications to access an audio device and allows backward compatibility with existing audio applications because, among other things, the current Application Program Interface (API) does not change. The ability to write to an existing API allows the splitting and mixing operations to be transparent regardless of the audio applications from which audio data is being received and transmitted for the mixing and splitting operations.

Therefore it is desirable to have a method and an apparatus for processing multiple simultaneous audio streams in kernel space.

BRIEF SUMMARY OF THE INVENTION

The present invention provides for processing of multiple simultaneous audio streams. Additionally, the present invention provides for the mixing and splitting capabilities in kernel space rather than in user space of a system's software environment. This allows for some backward compatibility with old applications running audio and allows for writing to an existing interface. The ability to write to an existing interface allows the splitting and mixing operations to be transparent regardless of the audio applications from which audio data is being received and transmitted for the splitting and mixing operations.

In one embodiment of the invention, a computer has a central processing unit (CPU) coupled to a storage device. The storage device has several audio applications contained in user space. An audio server (mixer and/or splitter) and an audio device driver are in kernel space. The present invention also has a data flow checker and adjuster for checking the flow of data into data queues and a setup application for connecting the audio server and the audio device driver. The data flow checker and adjuster adjusts the flow of data by sending a message upstream or downstream instructing the upstream or downstream processes/devices to send more data or stop sending data depending on how full the data queues are.

BRIEF DESCRIPTION OF THE DRAWINGS

FIGS. 4a, 4b and 4c illustrate the mixing function of the audio device driver through the audio server of the present invention.

FIGS. 5a, 5b and 5c illustrate the splitting function of the audio server of the present invention.

FIG. 8 illustrates an exemplary embodiment of the present invention with telephony applications transmitting and reading data to and from an ISDN device driver.

FIG. 9 illustrates an exemplary embodiment of the present invention for a general desktop use.

DETAILED DESCRIPTION OF THE INVENTION

A method and an apparatus for allowing multiple audio-video applications and/or audio-video devices to access and utilize an audio server are disclosed.

Figure 1:
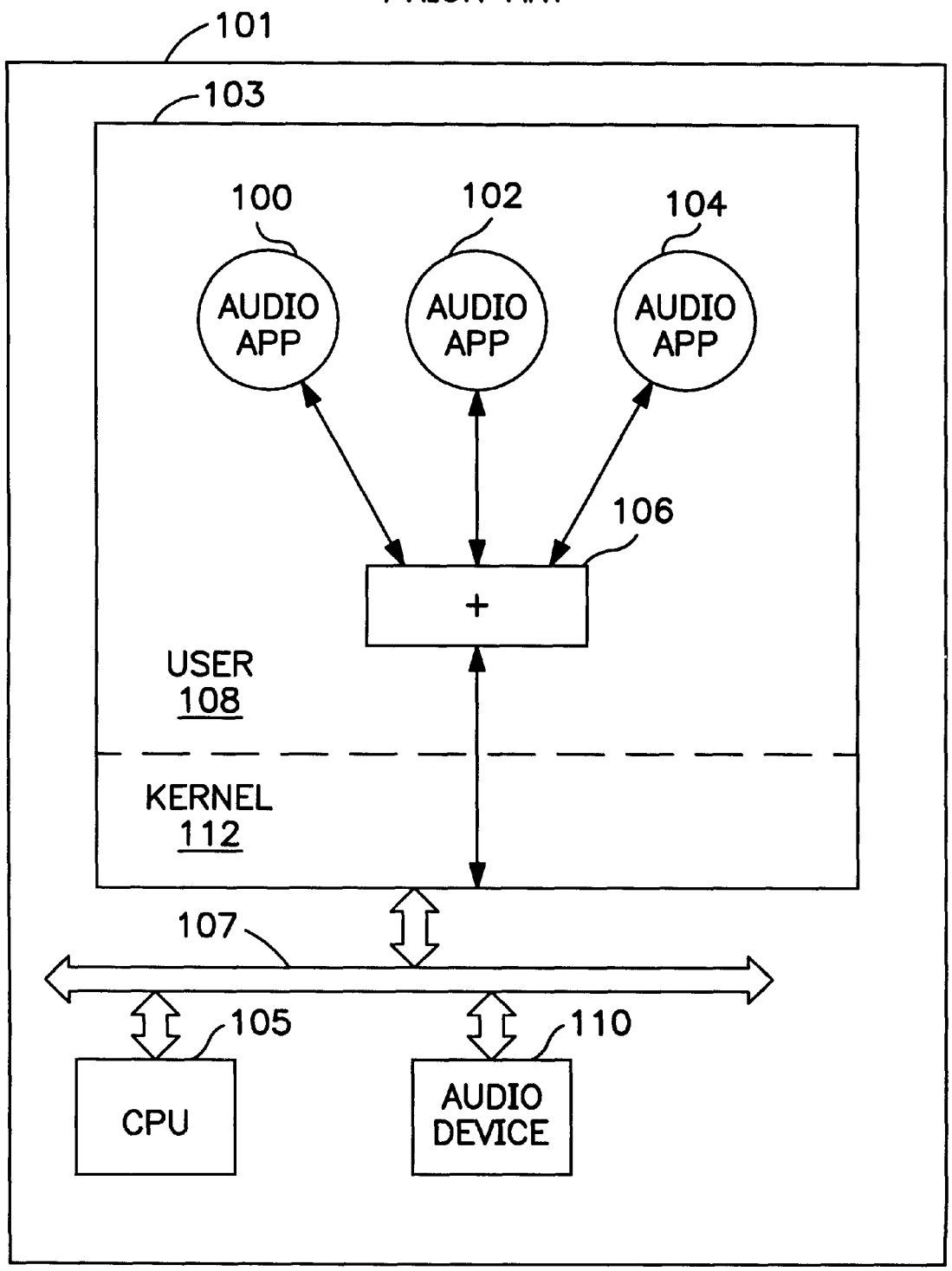
FIG. 1 illustrates an exemplary embodiment of a conventional mixer/splitter employed in a conventional computer.
Figure 2:
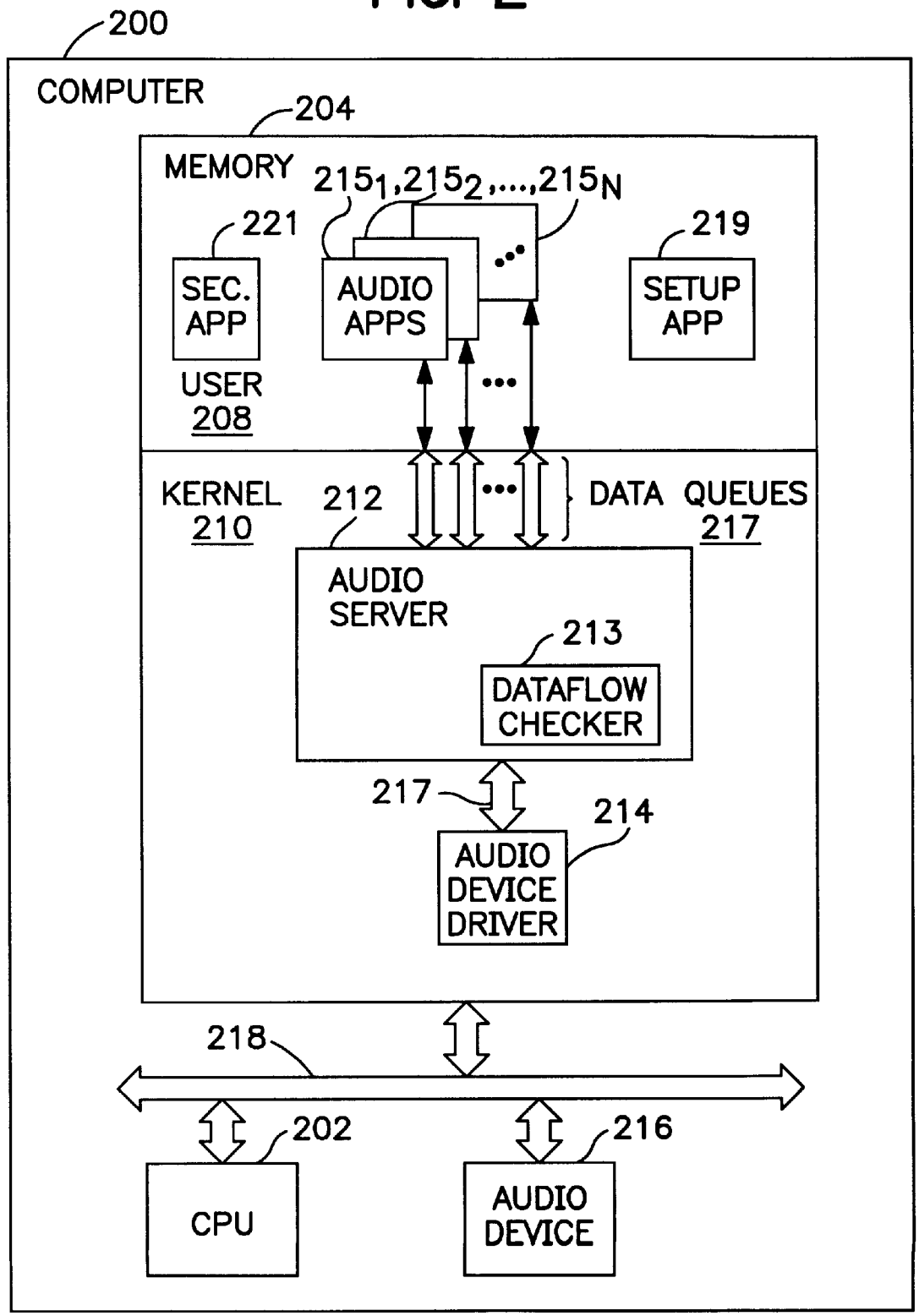
FIG. 2 illustrates a computer system with an exemplary implementation of the present invention.

FIG. 2 illustrates a computer 200 with an exemplary implementation of the present invention. Computer 200 has CPU 202 coupled to memory device 204 through bus 203. Memory device 204 has a plurality of audio applications $215_1, 215_2, \ldots, 215_N$ contained in user space 208. Audio server (e.g. mixer and/or splitter) 212 and audio device driver 214 are contained in kernel space 210. The audio server 212 includes a data flow checker and adjuster 213 which monitors the flow of data to and from data queues 217, a setup application 219 for adding audio applications $215_1, 215_2, \ldots, 215_N$ to the mixer/splitter operations of audio server 212, and security application 221 for providing an optional secure mode preventing unauthorized audio applications from being added to the mixer/splitter operations of audio server 212. Data flow checker and adjuster 213 adjusts the flow of data by sending a message upstream or downstream instructing the upstream or downstream processes/devices to send more data or stop sending data depending on the current capacity of the data queues 217. The use of data streams in processing of audio data is well known in the art.

Figure 3:
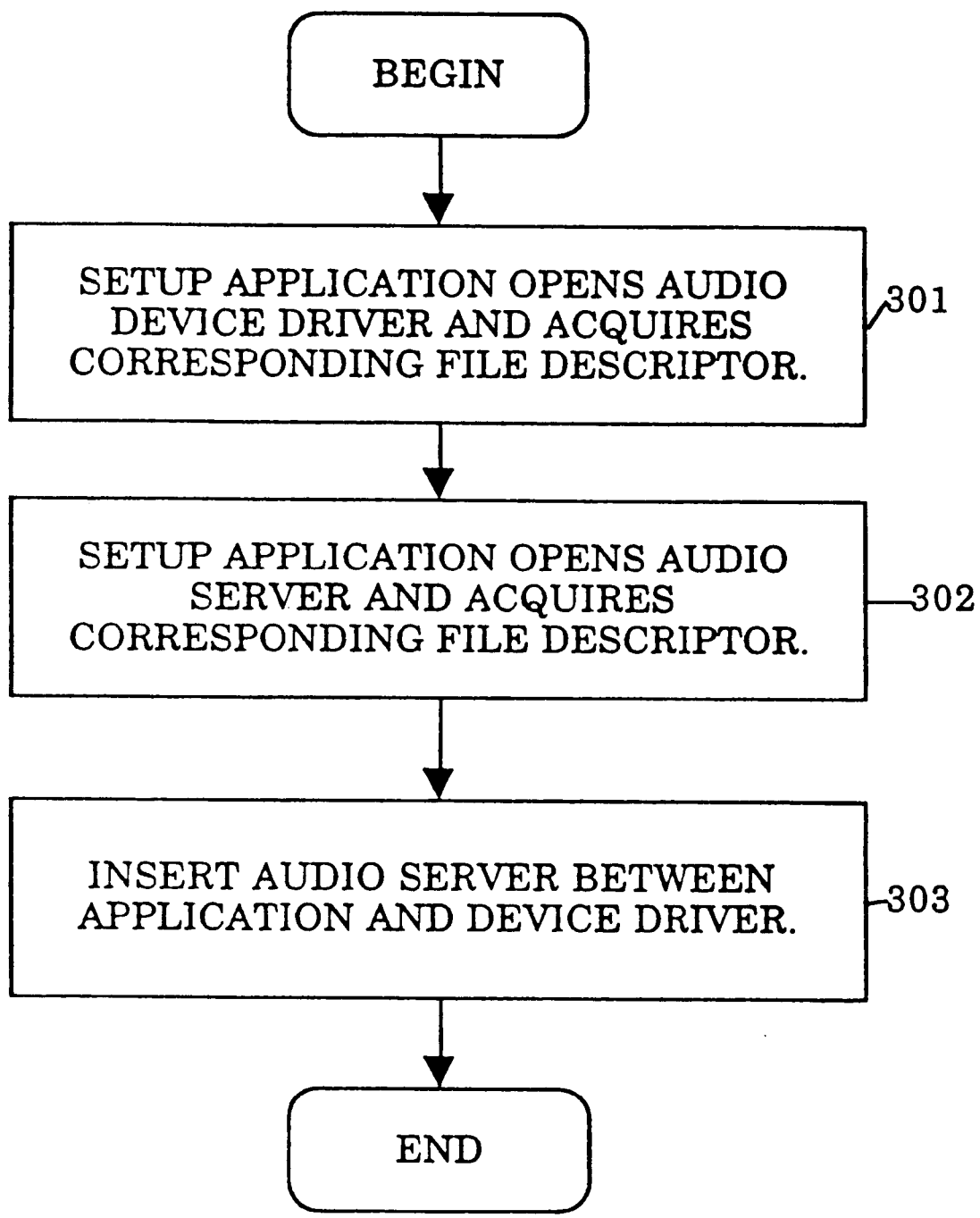
FIG. 3 is a flow diagram illustrating the general steps followed in the setup application of the present invention.

A more detailed description of setup application 219 is presented in the text accompanying FIG. 3. Additionally, a more detailed description of data flow checker and adjuster 213 is presented in the text accompanying FIG. 6. Audio applications $215_1, 215_2, \ldots, 215_N$ transmit audio data to audio server 212 which in turn mixes the audio data and transmits the audio data to audio device 216 coupled to memory 204 via bus 218 through audio device driver 214. Audio device driver 214 is a software program which enables computer 200 to communicate with the audio device 216 which typically is a microphone, a speaker or any other device capable of accepting/outputting audio data. Audio server 212 may also be utilized when audio device 216 transmits information to audio applications $215_1, 215_2, \ldots 215_N$ through audio device driver 214. Examples of audio applications $215_1, 215_2, \ldots 215_N$ include, but are not limited to, Sun Microsystems, Inc.'s AUDIOTOOL™, AUDIOPLAY™ and AUDIORECORD™. An example of audio device driver 214 includes, but are not limited to, Sun Microsystems, Inc.'s a combination audio/dual basic rate interface (DBRI) device driver allowing applications to access audio and integrated services digital network (ISDN) functionality on SBUS equipped machines.

CPU 202 includes circuits that control the interpretation and the execution of instructions which carry out the mixing and splitting operations performed by audio server 212 and the transmission of data between audio applications $215_1, 215_2, \ldots 215_N$ and audio device 216 through audio device driver 214. Although not shown, computer 200 may also include a number of peripheral devices including a display device.

FIG. 3 is a flow diagram illustrating the process followed by the setup application of the present invention. In block 301, setup application opens audio device driver and acquires a file descriptor associated with the audio device driver. In block 302, application opens audio server 212 and acquires another file descriptor to identify the audio server. At this point, setup application 219 has two open file descriptors and the audio server is not yet involved with the audio device driver. In block 303, setup application executes an input/output control command to add audio applications to the operations performed by the audio server.

Audio servers support multiple I/Q ports. In initiating processing of a second application, the audio server is opened as was done in block 301. A separate unique file descriptor is obtained by the setup application from an operating system which controls execution of the audio applications for the second application. The second audio server port which has been opened is added to the mix of the audio server providing for two ports. This process can be repeated to support N audio server ports.

Figure 7:
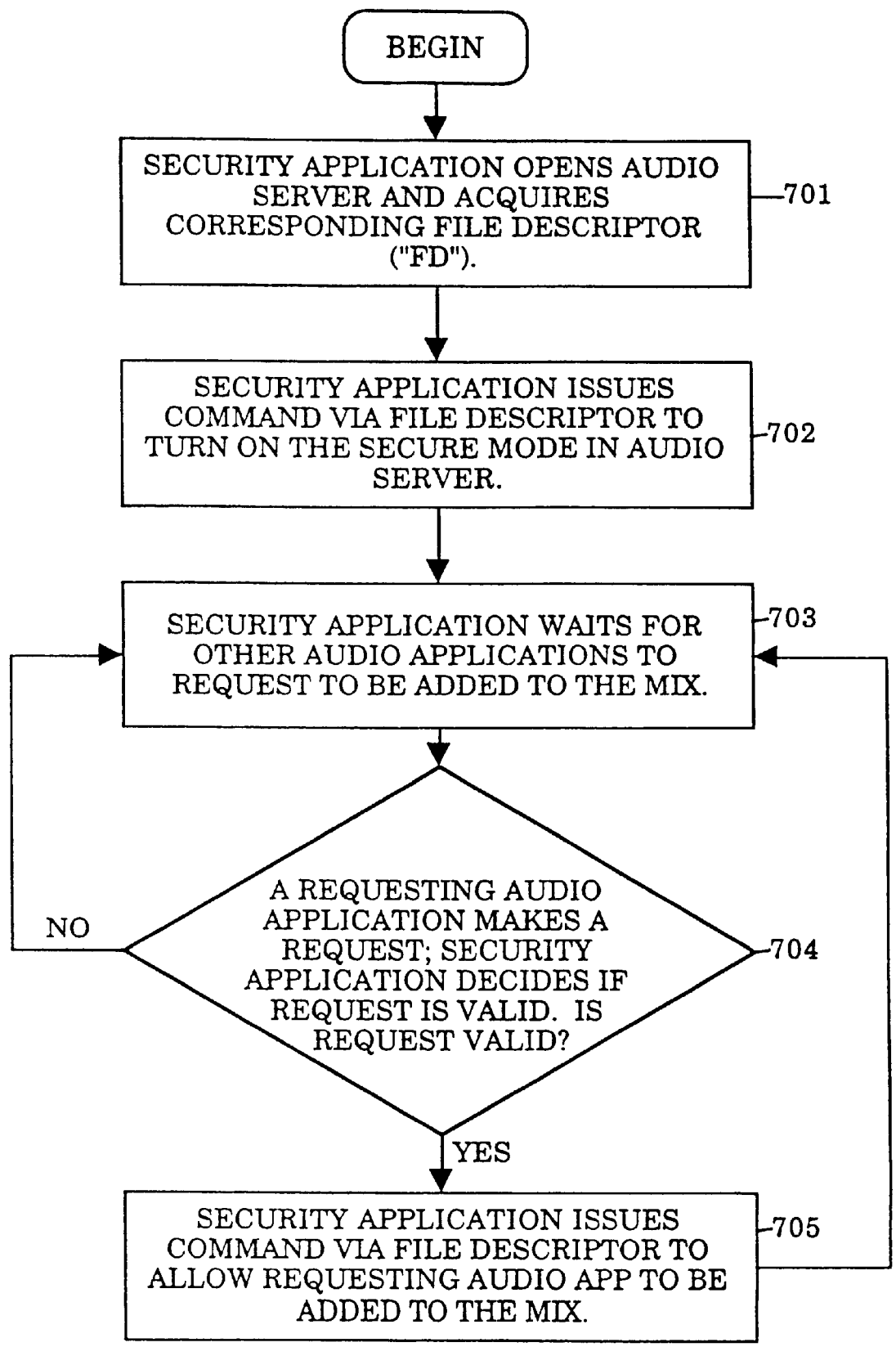
FIG. 7 is a flow diagram illustrating the general steps followed to turn on the present invention's optional secure mode to add audio applications.

Additionally, a security application provides for an optional secure mode when adding additional audio applications to an audio mix. More specifically, when the secure mode is turned on, the security application turns away unauthorized audio applications requesting to be added to the audio mix. A more detailed description of the secure mode is illustrated in FIG. 7 and the accompanying text.

Figure 4A:
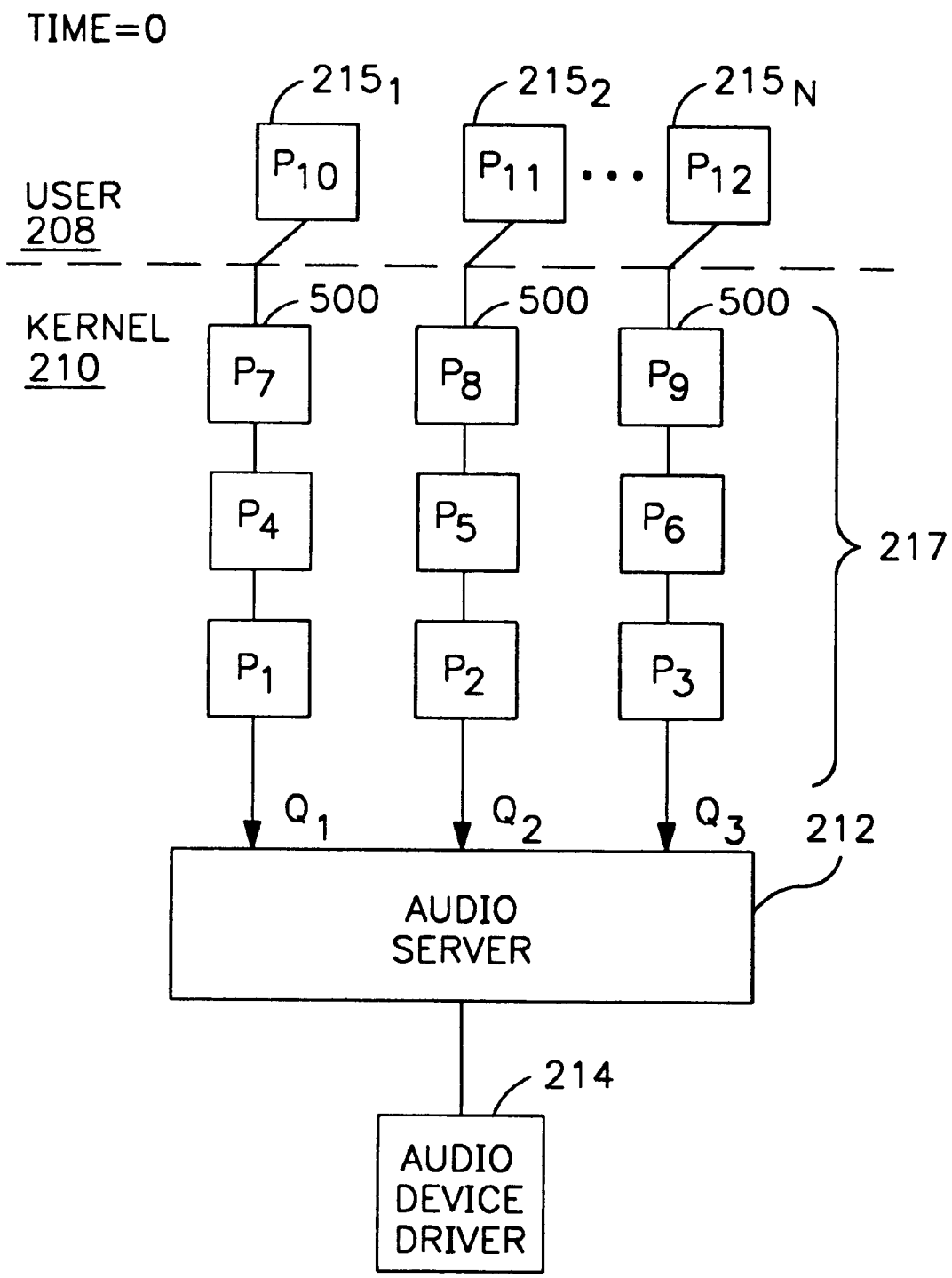

FIGS. 4a–4c illustrate how packets of information are transmitted from the plurality of audio applications 215l, $215_2, \ldots, 215_N$ to audio server 212 which, in turn, are mixed and transmitted to audio device driver 214. FIG. 4a illustrates the process at time 0. Audio data is typically transmitted in packets 500 from the plurality of audio applications $215_1, 215_2, \ldots 215_N$ to an audio device driver 214. In the illustration, audio packets are illustrated as boxes labeled $P_1, \ldots, P_n$. An arbitrary number of packets are transmitted down data streams on data queues 217. The packets may be of arbitrary size.

Audio server 212 schedules a timer which activates audio server 212 to begin processing data and monitor data queues 217 to determine if there are any data packets in data queues 217. If there are data packets in data queues 217, then audio server 212 takes a certain portion of the data packets and sends that portion "downstream" to audio device driver 214 after the data has been mixed.

If audio server 212 is activated too often (e.g. to begin processing data), then the queues may not fill fast enough with data packets 500, resulting in inefficient use of central processing unit (CPU) resources. If audio server 212 is not activated often enough, the data packets pile up in the data queues and the packets are not transmitted "downstream" at a fast enough rate to produce smooth audio output, introducing latency and possible breakup in the transmitted audio. The present invention utilizes a unique method of determining when to read data off the queues, mix it and send it "downstream" to audio device driver 214. The present invention's method assures that data is transmitted in a continuous stream. This method is described further in FIG. 6.

At time 1 in FIG. 4b, audio server 212 strips the packets of information off data queues 217. The packets retrieved are mixed to produce mixed packet $M_1$. More specifically, $M_1$ represents the sound that would be obtained if the three packets of data $P_1$, $P_2$ and $P_3$ are mixed together. At time 2 in FIG. 4c, audio server 212 transmits packet $M_1$ down to audio device driver 214. At the same time, audio server 212 has already read the next set of packets $P_4$, $P_5$ and $P_6$ off of data queues Q1, Q2 and Q3 217 and the process is repeated.

Figure 5A:
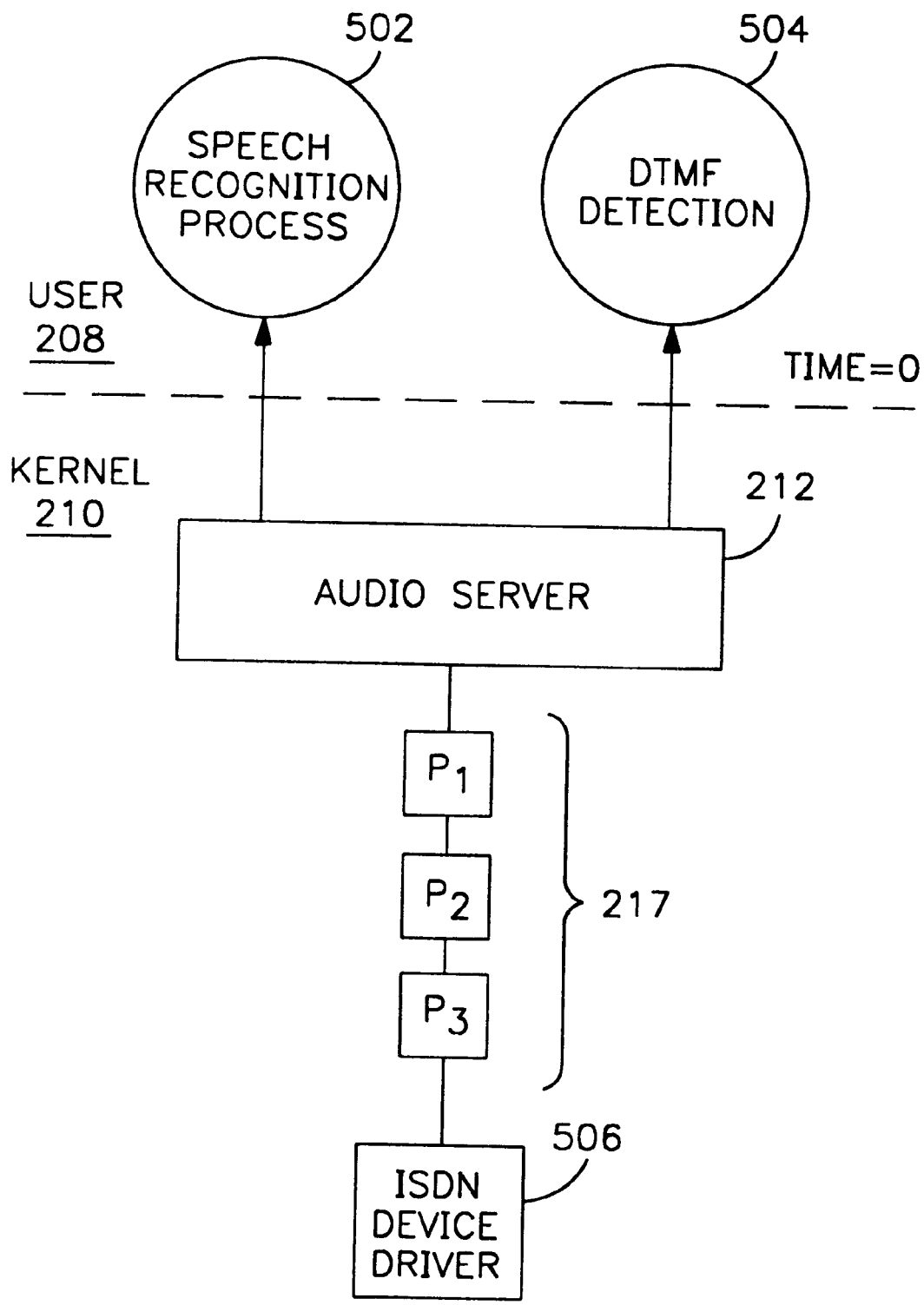

FIGS. 5a, 5b and 5c illustrate the splitting (e.g. cloning) function of audio server 212 of the present invention. In FIG. 5a, speech recognition process 502 and Dual Tone Multi Frequency (DTMF, e.g. touch tone) detection process application 504 read data transmitted from ISDN (Integrated Services Digital Network) device driver 506. Packets $P_1$, $P_2$ and $P_3$ are transmitted upstream from ISDN device driver 506 at time 0.

As illustrated in FIG. 5b, audio server 212 reads packet 1 as sent upstream by ISDN device driver 506 and duplicates or clones the packet into packets $S_1$ and $S_2$. At time 2, as illustrated in FIG. 5c, packets S1 and S2 are transmitted "upstream" to speech recognition process application 502 and DTMF detection process application 504 respectively. Audio server 212 continues to read packets being sent upstream from ISDN device driver 506 and continues cloning the packets for delivery to the telephony applications.

As with the mixing function of the audio server 212, data must not be read too fast or too slowly. For example, if audio server 212 is not reading packets coming upstream from ISDN device driver 506 fast enough, then ISDN device driver 506 may shut itself down and stop I/O due to flow control. In a worst case scenario, if ISDN device driver 506 does not shut itself down, then it will continue to output packets upstream. Consequently, telephony applications 502 and 504 will not be able to read all the packets in a timely fashion causing additional latency, e.g. delay, from when the packets were sent by ISDN device driver 506 and received by telephony applications 502 and 504. On the other hand, if audio server 212 attempts to read packets too quickly, then the packets will not arrive in time to be read causing inefficient use of CPU resources.

For example, if telephony applications 502 and 504 stop accepting data, audio server 212 will have no idea that telephony applications 502 and 504 have stopped and will continue to send data upstream. Eventually, data queues 217 upstream will fill up and audio server 212 recognizes that data queues 217 are filled. At this point, the present invention causes a message to be sent downstream to the audio device driver or ISDN device driver 506 asking them to stop sending any more additional packets. In an alternate embodiment, any additional data which are transmitted from the audio or ISDN device driver 506 are discarded.

The present invention also converts "A-law", "µ-law" and "linear Pulse Code Modulation" (PCM) audio data as it is transmitted back and forth between the audio applications and the audio device driver. A-law, µ-law and linear PCM are digital representation of an analog audio signal, typically sampled at approximately 8 KHz. For every sample, the amplitude of the audio signal is assigned (quantized) a digital value. For these three encodings, the values used to represent the amplitude is a number between zero and +/−127. More detail may be found in the ITU (International Telecommunication Union) standard G.711, published 1988.

The present invention, in order to minimize the time necessary to convert between the digitized value and its amplitude, uses a pre-computed table of amplitude values for each encoding which can be indexed with the digitized value. Since audio applications identify what encoding they will use when they invoke audio server 212, audio server 212 can transparently convert the A-law, µ-law and linear PCM data at the time the mix function is called within audio server 212.

Figure 6:
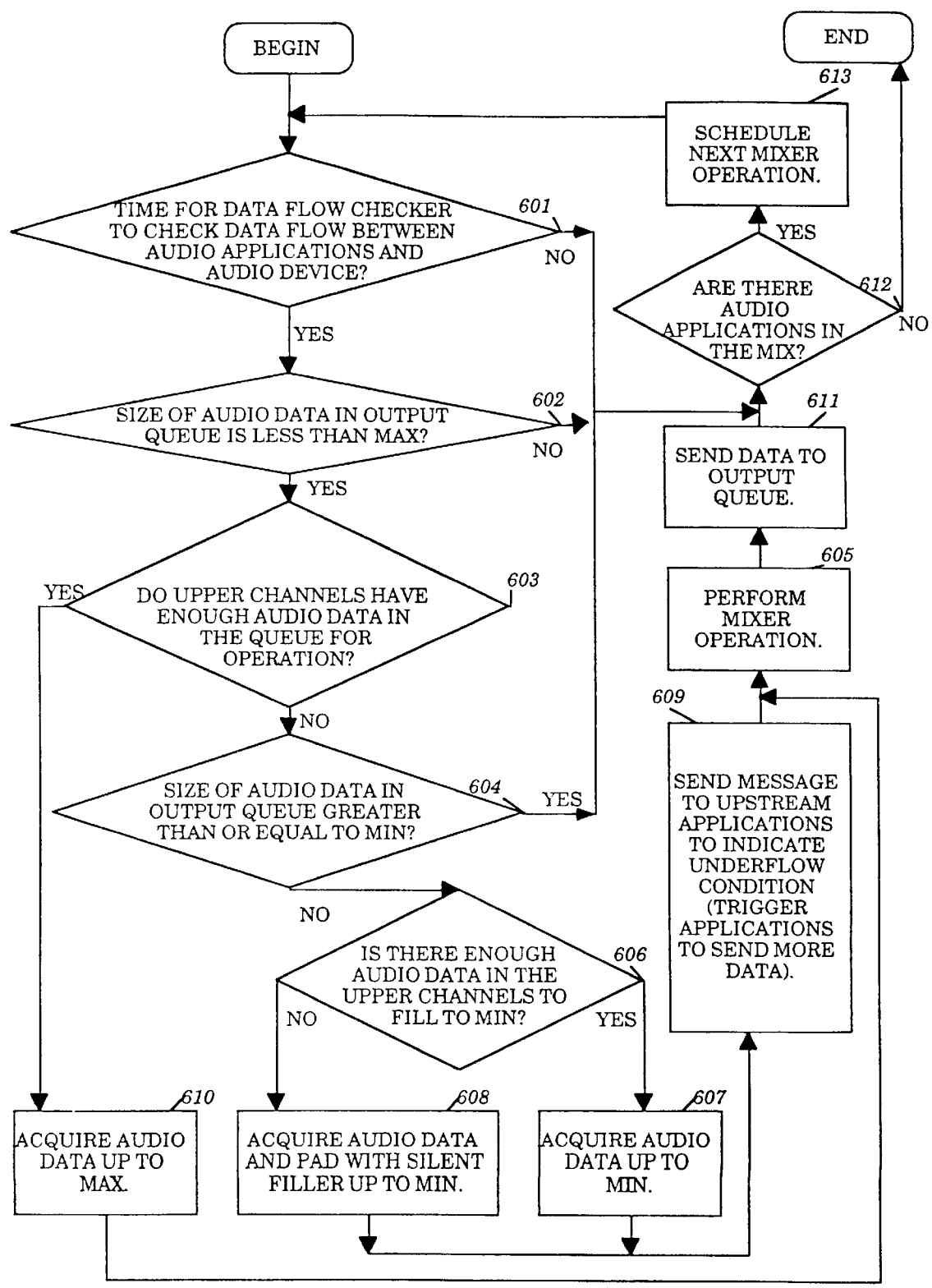
FIG. 6 is a flow diagram illustrating how the present invention deals with scheduling and when the mixer reads additional data.

FIG. 6 is a flow diagram illustrating the process followed by an embodiment of the data flow checker and adjuster of the present invention in scheduling the data flow for the mixing operation of the audio server. Since the transmission of audio data between the applications in user space and the audio device driver in kernel space are asynchronous, a mechanism must be put into place which determines when audio server 212 is to check the lower queues for upstream data coming from the audio device and the upper queues for downstream data coming from the audio applications and how often it must do so. As mentioned earlier, if audio server 212 checks the queues for data packets too quickly, then less than maximum amount of data packets will be processed by audio server 212 leading to inefficient use of CPU resources. If audio server 212 checks for data packets in queues too slowly, then data packets are not processed fast enough and the queues may fill up. Once the queues are full, some data packets may be discarded from lack of being read. In the alternative, the audio device may shut itself down if none of the data packets are being read.

In block 601, if it is time for the data flow checker to check the data flow between the audio applications and the audio devices, then go to block 602. In block 602, if the size of audio data in the output queue is less than the maximum size of data to be mixed in each round of mixing operations, then go to block 603. In block 603, if upper channels do not have enough data in the queue for the audio server operation and in block 604, if the size of data in the audio device's output queue is greater than or equal to a predetermined minimum audio data size to be inserted in the audio device output queue (low water mark) 610, then in block 605, the audio server operation is performed. In block 611, data is sent to the output queue. Otherwise, in block 606, there is enough audio data in the upper channels to fill the output queue up to a predetermined minimum, then in block 607, audio data is acquired from the upper channels to fill the output queues to the minimum audio data size. If there is not enough audio data in the upper channels to fill the output queues to a predetermined minimum audio data size, then in block 608, the present invention fills up the queue with a silent audio signal and sends out a message to the appropriate applications to notify them of the underflow condition in block 609 (allowing the process to start sending more data downstream).

Back in block 603, if the size of audio data in the output queue is less than the maximum and the channel has enough audio data in the queue for the audio server operation, then in block 610, audio server 212 inserts additional audio data in the output queue such that the output queue contains the maximum size of audio data to be mixed in each round of a mixing/splitting operation of audio server 212.

Back in block 602, if the size of data in the audio device's output queue is greater than or equal to the maximum size of audio data (in terms of micro seconds) to be mixed in each round of mixing operation (high water mark), then go to block 612.

In block 612, it is determined whether there are audio applications in the mixing operation. If there are none, then the process is completed. Otherwise, in step 613, the next mixer operation is scheduled and the process repeats itself.

The asynchronisity of data flow is handled similarly for the splitting operation of the present invention.

FIG. 7 is a flow diagram illustrating the process followed to turn on the optional secure mode of the present invention and to add audio applications. In block 701, a security application, defined as an application written by the user which runs in user space and implements some form of security policy, opens the audio server and acquires a corresponding file descriptor. In block 702, the security application issues an input/output command to turn on the secure mode in audio server 212.

In block 703, the security application waits for other audio applications, defined as audio applications written by the user which runs in user space and is capable of communicating with the security application, to request permission to be added to the mix, defined as the current mixer/splitter session allowing for audio data sent to and from the audio device to be mixed and distributed to the audio applications.

In block 704, a requesting audio application makes a request to join the mix to the security application. If the request is not allowed, then the request is ignored and the security application returns to block 703. If the request is allowed, then the security application continues to block 705.

In block 705, security application issues an input/output command via the file descriptor to allow the requesting audio application to be added to the mix. The security application then returns to step 703 to await future requests.

The present invention may be implemented for various applications. For example, in FIG. 8, multiple telephony applications including telephone record process 800, telephone speech recognition process 502 and telephone DTMF (Dual Tone Multi Frequency, such as "touch tone") detection process 504 transmit data to ISDN device driver 506 through audio server 212 and read data from ISDN device driver 506 through audio server 212.

Telephone record process application 800 may be utilized to record a phone call on the computer. Telephone speech recognition process 502 may be used to recognize vocal commands by a user of a computer and to respond in accordance to that vocal command, for example, through an Interactive Voice Response (IVR) system. Telephone DTMF detection process application 504 may be utilized to scan for DTMF tone by determining if a "0" has been pressed or if a "1" has been selected. One or more of these telephony applications may have access to the same telephony data through ISDN 506 and audio server 212.

In another exemplary embodiment, the present invention may be utilized in a general desktop use. For example in FIG. 9, desktop 900 may include software applications including, but not limited to ShowMe™ TV software program 902 and Contool 904 by Sun Microsystems, Inc. of Mountain View, Calif. ShowMe™ TV 902 is a computer program which displays television (TV) programs on a desktop. ShowMe™ TV 902 receives broadcast audio and video data over a network displayed on desktop 900 and sends audio data to audio device driver 214 through audio server 212.

Contool 904 from Sun Microsystems, Inc. of Mountain View, Calif., is a software application which is designed to monitor various system events on a given computer. For example, Contool 904 may alert a user upon the occurrence of a certain predetermined event on a computer. To alert the user of an event, Contool 904 may enable a flashing message on the display screen of the computer or may display some other type of prompt to the user. For example, if a user in a network is attempting to communicate with another user in the network, Contool 904 may enable a prompt to be displayed to the latter user through his/her computer display device stating that another user wants to access the user. Instead of a visual prompt, Contool 904 may also enable an audio prompt to alert the user that another user in the network would like to access the user.

Another example use of Contool 904 requiring the use of audio device driver 214 is when someone is trying to log onto another user's workstation causing a security breach. Contool 904 may then alert the user of the security breach through, for example, some type of an audio prompt.

In prior art devices, exemplary general desktop applications such as ShowMe™ TV 902 may run a continuous loop of audio stream without the desktop being able to stop the audio stream. In such a case, if there is some type of a security breach or if a user desired to contact the user of desktop 900 through Contool 904, that information would be put on hold until ShowMe™ TV 902 has terminated its program.

The present invention allows processing of multiple audio data streams. Hence, with the present invention, while ShowMe™ TV 902 is running an application playing audio data and while Contool 904 is producing occasional audio prompts to the user at the same time, audio server 212 accepts audio data from audio device driver 212 for both ShowMe™ TV 902 and Contool 904.

What has been described is a method and an apparatus for securely processing multiple simultaneous audio streams in kernel space.

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. A method to process a plurality of data streams being transmitted between a memory device and at least one audio device coupled to a computer system, the method comprising:

processing a plurality of first audio data streams being transmitted betwreen at least one application running in user space of the memory device and the at least one audio device, said processing being performed by an audio server in kernel space of the memory device; and adjusting flow of data of the plurality of first audio data streams between said at least one application running in user space and said at least one audio device by checking at least one lower queue for upstream data coming from said at least one audio device and at least one upper queue for downstream data coming from the at least one audio application to prevent data overflow and underflow conditions; and using a security module which runs in user space to prevent data from an unauthorized application from being processed by said audio server, wherein said security module receives a request to add an audio application and enables a second audio data stream generated by the audio application associated with the request to be added to the processing of the plurality of first audio data streams.

2. The method of claim 1 wherein said processing further comprises interfacing said at least one application with said at least one audio device through a device driver.

3. The method of claim 2 further comprising acquiring at least one file descriptor for said device driver.

4. The method of claim 1 further comprising processing audio data from said at least one application by said audio server.

5. The method of claim 1 wherein said adjusting further comprises determining whether to check data flow between said at least one application and said at least one audio device.

6. The method of claim 5 further comprising determining size of audio data in a queue between said at least one application and said at least one audio device.

7. The method of claim 6 further comprising performing an operation of said audio server if said predetermined size of audio data in said queue is greater than or equal to a predetermined minimum and less than a predetermined maximum.

8. The method of claim 5 further comprising skipping an operation of said audio server if said size of said audio data is greater than or equal to a predetermined maximum.

9. The method of claim 6 further comprising adding additional audio data if said predetermined size of said audio data is less than a predetermined minimum.

10. An apparatus to process multiple data streams between a plurality of audio applications and at least one audio device, including code configured for storage on a computer-readable medium and executable by a computer, the code including a plurality of modules each configured to carry out at least one function to be executed by the computer, said apparatus comprising:

an audio server module configured to process the multiple data streams in kernel space, said audio server module utilizing a data flow checker and adjuster module configured to adjust flow of data of said multiple data streams between the plurality of audio applications running in user space and the at least one audio device; and a security module which runs in user space configured to prevent data from an unauthorized application from being processed by said audio server, wherein said security module receives a request to add an audio application and enables audio data stream generated by the audio application associated with the request to be added to the processing of the plurality of audio data streams if said request is valid.

11. The apparatus of claim 10 further comprising a setup module configured to allow data from more than one of said plurality of audio applications to be approximately simultaneously processed by said audio server.

12. A system to process multiple data streams between a plurality of audio applications and at least one audio device, including code configured for storage on a computer-readable medium and executable by a computer, the code including a plurality of modules each configured to carry out at least one function to be executed by the computer, said system comprising:

an audio server module configured to process the multiple data stream is in kernel space, said audio server module utilizing a data flow checker and adjuster nodule configured to adjust flow of data of said multiple data streams between the plurality of audio applications running in user space and the at least one audio device by checking at least one lower queue for upstream data coming from the at least one audio device and upper queues for downstream data coming from the audio applications to prevent data overflow and underflow conditions; and a security module which runs in user space configured to prevent data from an unauthorized application from being processed by said audio server, wherein said security module receives a request to add an audio application and enables audio data stream generated by the audio application associated with the request to be added to the processing of the plurality of audio data streams in said request is valid.

13. The system of claim 12 further comprising a setup module configured to allow data from more than one of said plurality of applications to be approximately simultaneously processed by said audio server.

14. The system of claim 12 wherein said audio server module configured to determine when to read multiple packets of audio data from the plurality of audio applications and mix the multiple packets of audio data to produce a mixed packet and send the mixed packet to the at least one audio device such that overflow and underflow conditions are prevented.

15. The system of claim 14 wherein said audio server module is further configured to determine when to read audio data from the at least one audio device and split said audio data before said audio data is sent to the plurality of audio applications such that overflow and underflow conditions are prevented.

16. The system of claim 12 further comprising an audio device driver to provide interfacing between said audio server module and said at least one audio device.

17. The apparatus of claim 10 wherein said audio server module configured to determine when to read multiple packets of audio data from the plurality of audio applications and mix the multiple packets of audio data to produce a mixed packet and send the mixed packet to the at least one audio device such that overflow and underflow conditions are prevented.

18. The apparatus of claim 17 wherein said audio server module is further configured to determine when to read audio data from the at least one audio device and split said audio data before said audio data is sent to the plurality of audio applications such that overflow and underflow conditions are prevented.

19. The apparatus of claim 10 further comprising an audio device driver to provide interfacing between said audio server module and said at least one audio device.

* * * * *